(12) United States Patent
Park

(10) Patent No.: US 11,407,116 B2
(45) Date of Patent: Aug. 9, 2022

(54) ROBOT AND OPERATION METHOD THEREFOR

(71) Applicant: LG ELECTRONICS INC., Seoul (KR)

(72) Inventor: Jungmin Park, Seoul (KR)

(73) Assignee: LG Electronics Inc., Seoul (KR)

(*) Notice: Subject to any disclaimer, the term of this patent is extended or adjusted under 35 U.S.C. 154(b) by 429 days.

(21) Appl. No.: 16/476,061

(22) PCT Filed: Dec. 12, 2017

(86) PCT No.: PCT/KR2017/014513
§ 371 (c)(1),
(2) Date: Jul. 3, 2019

(87) PCT Pub. No.: WO2018/128292
PCT Pub. Date: Jul. 12, 2018

(65) Prior Publication Data
US 2019/0351558 A1 Nov. 21, 2019

(30) Foreign Application Priority Data
Jan. 4, 2017 (KR) .................. 10-2017-0001283

(51) Int. Cl.
*G05B 19/04* (2006.01)
*G05B 19/18* (2006.01)
(Continued)

(52) U.S. Cl.
CPC ............ *B25J 9/1697* (2013.01); *B25J 13/06* (2013.01); *B25J 13/086* (2013.01); *B25J 19/06* (2013.01);
(Continued)

(58) Field of Classification Search
CPC ............ G08G 1/16; G06T 2207/10048; G06T 2207/30196; G06T 7/70; G06K 9/00362;
(Continued)

(56) References Cited

U.S. PATENT DOCUMENTS 9,174,342 B2 * 11/2015 Pinter .................... B25J 9/1676
9,956,687 B2 * 5/2018 Florencio ............... G06N 3/008
(Continued)

FOREIGN PATENT DOCUMENTS

JP 4080165 B2 * 4/2008
KR 200441761 9/2008
(Continued)

OTHER PUBLICATIONS

PCT International Application No. PCT/KR2017/014513, International Search Report dated Mar. 12, 2018, 2 pages.

*Primary Examiner* — Harry Y Oh
(74) *Attorney, Agent, or Firm* — Lee, Hong, Degerman, Kang & Waimey PC

(57) ABSTRACT

A robot according to an embodiment of the present invention comprises: a user interface unit configured to receive an input from a user; an object recognition unit configured to sense a human body and an object; a position recognition unit configured to sense positions of the human body and the object; a driving driver configured to control movement of the robot; and a controller configured to control an operation of the robot, wherein the controller is configured to perform control such that: when the human body is detected within a predetermined first range by the robot, the robot is woken up and a touch monitor included in the user interface unit is
(Continued)

turned on, and when the human body is detected within a predetermined second range by the robot, content for receiving an input from the user is output on the touch monitor.

11 Claims, 12 Drawing Sheets

(51) Int. Cl.
| | |
|---|---|
| *B25J 9/16* | (2006.01) |
| *G06T 7/70* | (2017.01) |
| *B25J 13/06* | (2006.01) |
| *B25J 13/08* | (2006.01) |
| *B25J 19/06* | (2006.01) |
| *G08G 1/16* | (2006.01) |
| *G06V 40/10* | (2022.01) |

(52) U.S. Cl.
CPC ............... *G06T 7/70* (2017.01); *G06V 40/10* (2022.01); *G08G 1/16* (2013.01); *G06T 2207/10048* (2013.01); *G06T 2207/30196* (2013.01)

(58) Field of Classification Search
CPC . G06K 2209/21; G06K 9/00664; B25J 13/06; B25J 13/086; B25J 19/06; B25J 9/1697; B25J 11/00; B25J 11/0005; B25J 13/08; B25J 19/02; B25J 9/16
See application file for complete search history.

(56) References Cited

U.S. PATENT DOCUMENTS

| | | | | |
|---|---|---|---|---|
| 10,180,683 | B1* | 1/2019 | Libman | ................. G05D 1/028 |
| 2007/0192910 | A1* | 8/2007 | Vu | ............................ B25J 19/06 |
| | | | | 700/245 |
| 2012/0182392 | A1* | 7/2012 | Kearns | ................... B25J 19/023 |
| | | | | 348/46 |
| 2012/0185094 | A1* | 7/2012 | Rosenstein | .......... G05D 1/0251 |
| | | | | 700/259 |
| 2012/0197464 | A1* | 8/2012 | Wang | ......................... B25J 5/00 |
| | | | | 701/2 |
| 2013/0325244 | A1* | 12/2013 | Wang | ...................... G06T 11/00 |
| | | | | 701/26 |
| 2014/0354684 | A1* | 12/2014 | Beckwith | ........... G06K 9/00671 |
| | | | | 345/633 |
| 2016/0221191 | A1* | 8/2016 | Ota | ........................ B25J 9/1674 |
| 2017/0177558 | A1* | 6/2017 | Maltz | .................. G06F 3/04883 |
| 2018/0075403 | A1* | 3/2018 | Mascorro Medina | ....................... G06Q 10/087 |

FOREIGN PATENT DOCUMENTS

| | | | | |
|---|---|---|---|---|
| KR | | 100904191 | 6/2009 | |
| KR | | 20100120594 | 11/2010 | |
| KR | | 1020110103537 | 9/2011 | |
| KR | | 101362376 | 2/2014 | |
| WO | WO-2018000260 | A1 * | 1/2018 | ............... G06F 3/01 |

* cited by examiner

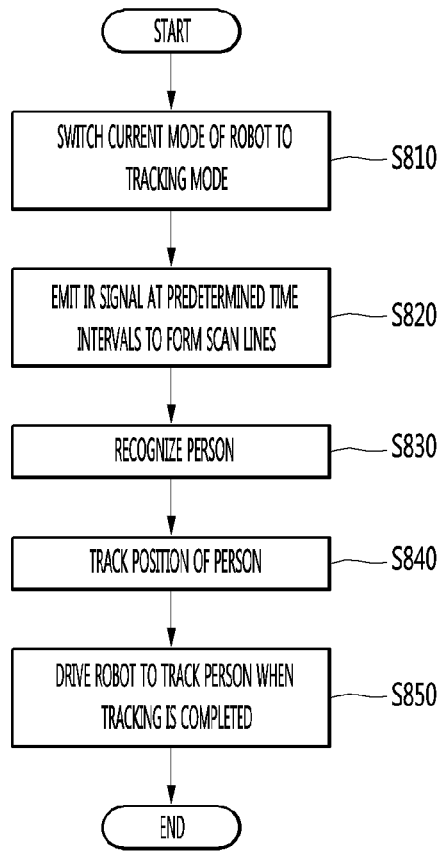
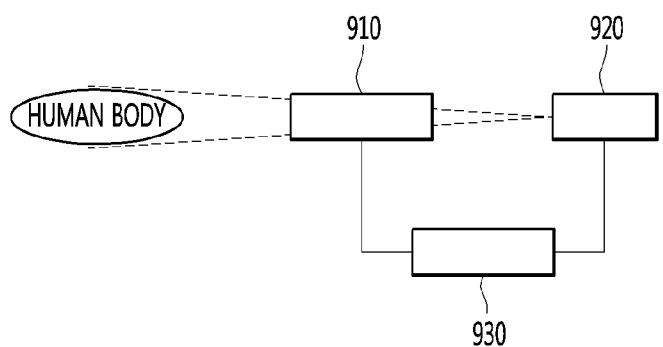

IMAGE DATA RELATED TO HUMAN BODY
HEAD - CIRCULAR SHAPE
BODY - CIRCULAR SHAPE LARGER THAN HEAD
ARMS - TWO
LEGS - TWO

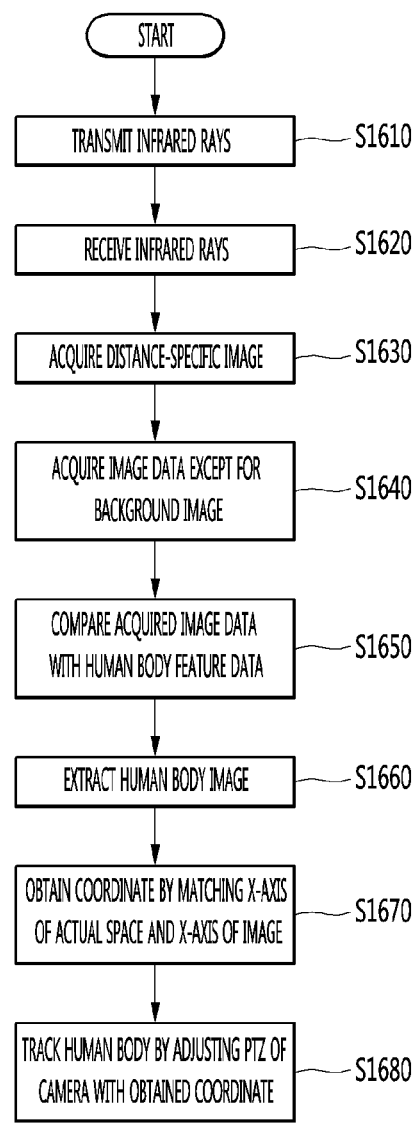

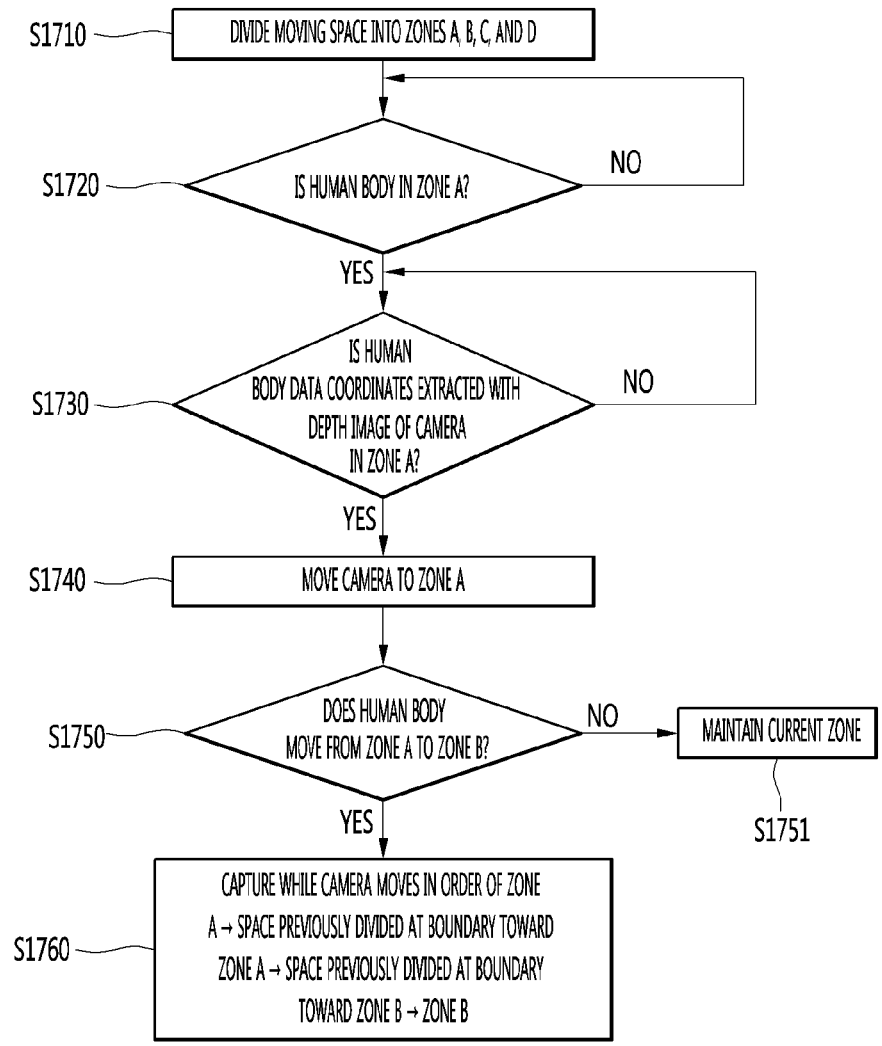

ROBOT AND OPERATION METHOD THEREFOR

CROSS-REFERENCE TO RELATED APPLICATIONS

This application is the National Stage filing under 35 U.S.C. 371 of International Application No. PCT/KR2017/014513, filed on Dec. 12, 2017, which claims the benefit of earlier filing date and right of priority to Korean Application No. 10-2017-0001283, filed on Jan. 4, 2017, the contents of which are all hereby incorporated by reference herein in their entirety.

TECHNICAL FIELD

The present invention relates to a robot and a method for operating the same, and more particularly, to an airport guide robot which is disposed at an airport and provides guide to users, and an operating method therefor.

BACKGROUND ART

Recently, as deep learning technology, self-driving technology, automatic control technology, and Internet of things (IoT) advance, it is possible to implement intelligent robots. Intelligent robots are disposed at public places such as airport, and thus, it is possible to provide users with various information and services.

Each technology will be described below in detail. Deep learning corresponds to the field of machine learning. The deep learning is technology which allows a program to perform similar determination on various situations, instead of a method where a condition and a command are previously set in a program. Therefore, according to the deep learning, computers may think similar to brains of humans and may analyze massive data.

Self-driving is technology where a machine determines and moves autonomously to avoid an obstacle. According to the self-driving technology, a robot autonomously recognizes and moves a position through a sensor to avoid an obstacle.

The automatic control technology denotes technology where a machine feeds back a measurement value, obtained by inspecting a machine state, to a control device to automatically control an operation of the machine. Therefore, control may be performed without manipulation by a user, and control may be automatically performed so that a desired control target reaches a desired range.

IoT denotes intelligent technology and service where all things are connected to one another over Internet and information exchanges between a user and a thing and between a thing and a thing. Devices connected to Internet through IoT transmit or receive information to perform autonomous communication, without the help of a user.

The application fields of robots are generally classified into industrial robots, medical robots, universal robots, and seabed robots. For example, in machine processing industry such as production of vehicles, robots may perform an iterative work. That is, industrial robots which learn an operation performed by arms of persons once and repeat the same operation for much time are being applied.

DISCLOSURE OF THE INVENTION

Technical Problem

An object of the present invention is to solve the process in which a user approaches an robot and manually wakes up so as to use the robot.

Another object of the present invention is to prevent a situation where a user collides with an robot in an environment where people are concentrated.

Further another object of the present invention is to accurately detect an object so as not to be confused with another user while guiding the user to the destination.

Technical Solution

A robot according to the present invention can provide a function of automatically waking up when a user comes within a certain distance by configuring a position recognition unit to sense a human body within a certain distance.

The robot according to the present invention can configure an algorithm to notify a warning sound when the robot and the human body approach each other over a certain distance.

The robot according to the present invention can provide a tracking function of tracking a person by recognizing a position of the person and an obstacle in an allocated area by using a plurality of position detection sensors designed such that scan lines are not overlapped.

Advantageous Effects

Since a robot according to the present invention constitutes a position recognition unit for sensing a human body within a certain distance and automatically wakes up when a user comes within a certain distance, an unnecessary step in which the user approaches the robot and manually wake up the robot so as to use the robot is eliminated.

Since the robot according to the present invention configures an algorithm to notify a warning sound when the robot and the human body approach each other over a certain distance, it is possible to prevent the user from colliding with the robot in an environment where people are concentrated.

Since the robot according to the present invention provides a tracking function of tracking a person by recognizing a position of the person and an obstacle in an allocated area by using a plurality of position detection sensors designed such that scan lines are not overlapped, it is possible to obtain an effect of providing a guidance service by tracking the user precisely so as not to be confused with other users while guiding the user to the destination.

Since the airport robot according to the present invention provides a tracking function of tracking a person by recognizing a position of the person and an obstacle in an allocated area by using a plurality of position detection sensors designed such that scan lines are not overlapped, it is possible to obtain an effect of providing a guidance service by tracking the user precisely so as not to be confused with other users while guiding the user to the destination.

BRIEF DESCRIPTION OF THE DRAWINGS

FIG. 8 is a flowchart illustrating a person tracking method of a robot according to the present invention.

FIG. 9 is a configuration diagram of a human body tracking imaging system according to an embodiment of the present invention.

FIG. 16 is a flowchart of human body tracking imaging according to an embodiment of the present invention.

FIG. 17 is a flowchart of a camera operation for tracking and imaging a human body along newly obtained coordinates according to an embodiment of the present invention.

BEST MODE

Hereinafter, embodiments relating to the present invention will be described in detail with reference to the accompanying drawings.

The suffixes "module" and "unit" for components used in the description below are assigned or mixed in consideration of easiness in writing the specification and do not have distinctive meanings or roles by themselves.

Figure 1:
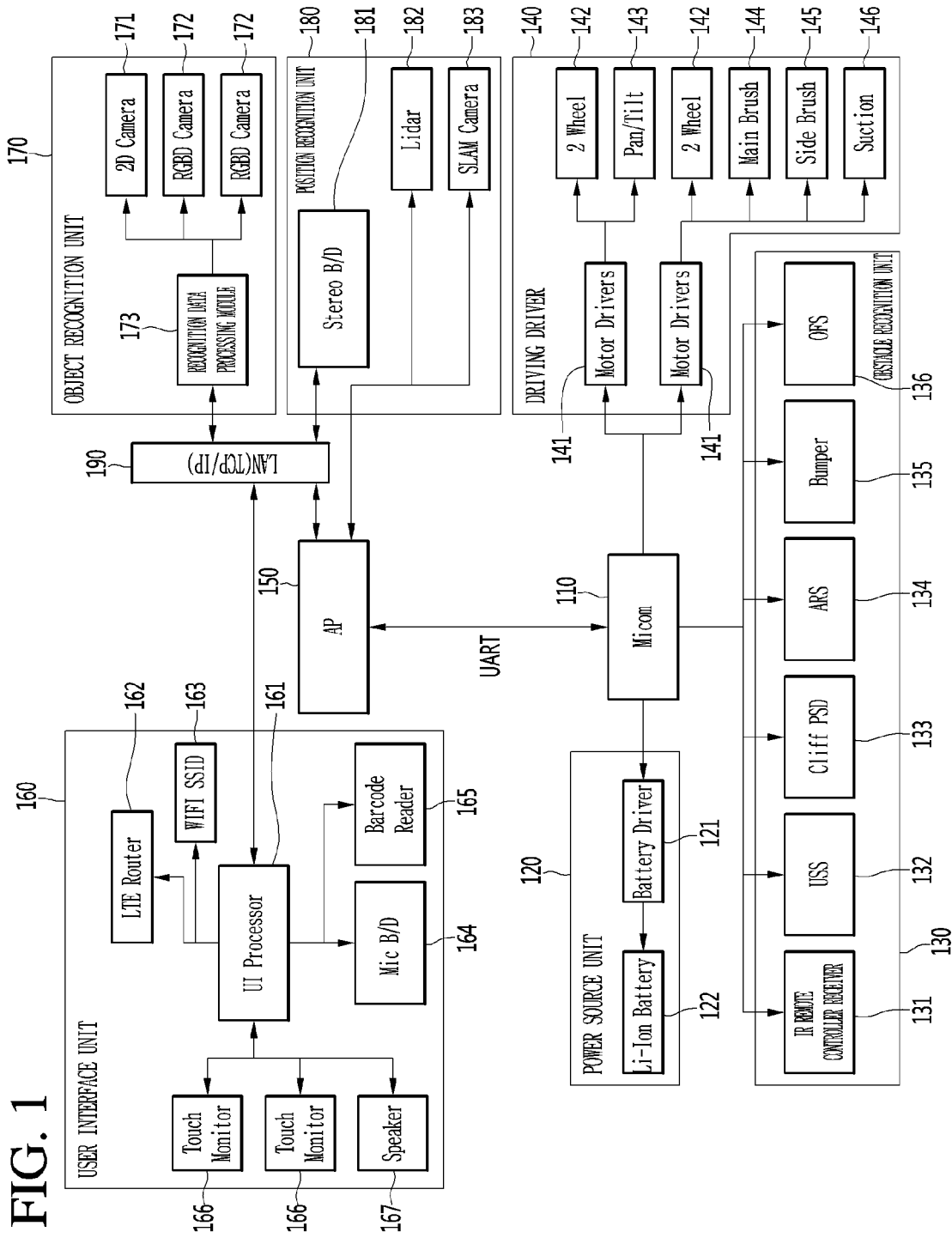
FIG. 1 is a block diagram illustrating a hardware configuration of an airport robot according to an embodiment of the present invention.

FIG. 1 is a block diagram illustrating a hardware configuration of an airport robot according to an embodiment of the present invention.

As illustrated in FIG. 1, hardware of the airport robot according to an embodiment of the present invention may be configured with a microcomputer group and an AP group. The microcomputer group may include a microcomputer 110, a power source unit 120, an obstacle recognition unit 130, and a driving driver 140. The AP group may include an AP 150, a user interface unit 160, an object recognition unit 170, a position recognition unit 180, and a local area network (LAN) 190. The user interface unit 160 may be referred to as a communication unit.

The microcomputer 110 may manage the power source unit 120 including a battery of the hardware of the airport robot, the obstacle recognition unit 130 including various kinds of sensors, and the driving driver 140 including a plurality of motors and wheels.

The power source unit 120 may include a battery driver 121 and a lithium-ion (Li-ion) battery 122. The battery driver 121 may manage charging and discharging of the Li-ion battery 122. The Li-ion battery 122 may supply power for driving the airport robot. The Li-ion battery 122 may be configured by connecting two 24V/102A Li-ion batteries in parallel.

The obstacle recognition unit 130 may include an infrared (IR) remote controller reception unit 131, an ultrasonic sensor (USS) 132, a cliff PSD 133, an attitude reference system (ARS) 134, a bumper 135, and an optical flow sensor (OFS) 136. The IR remote controller reception unit 131 may include a sensor which receives a signal from an IR remote controller for remotely controlling the airport robot. The USS 132 may include a sensor for determining a distance between an obstacle and the airport robot by using an ultrasonic signal. The cliff PSD 133 may include a sensor for sensing a precipice or a cliff within a forward-direction airport robot driving range of 360 degrees. The ARS 134 may include a sensor for detecting a gesture of the airport robot. The ARS 134 may include a sensor which is configured with an acceleration 3-axis and a gyro 3-axis for detecting the number of rotations. The bumper 135 may include a sensor which senses a collision between the airport robot and an obstacle. The sensor included in the bumper 135 may sense a collision between the airport robot and an obstacle within a 360-degree range. The OFS 136 may include a sensor for measuring a phenomenon where a wheel is spinning in driving of the airport robot and a driving distance of the airport robot on various floor surfaces.

The driving driver 140 may include a motor driver 141, a wheel motor 142, a rotation motor 143, a main brush motor 144, a side brush motor 145, and a suction motor 146. The motor driver 141 may perform a function of driving the wheel motor, the brush motor, and suction motor for driving and cleaning of the airport robot. The wheel motor 142 may drive a plurality of wheels for driving of the airport robot. The rotation motor 143 may be driven for a lateral rotation and a vertical rotation of a head unit of the airport robot or a main body of the airport robot, or may be driven the direction change or rotation of a wheel of the airport robot. The main brush motor 144 may drive a brush which sweeps filth on an airport floor. The side brush motor 145 may drive a brush which sweeps filth in a peripheral area of an outer surface of the airport robot. The suction motor 146 may be driven for sucking filth on the airport floor.

The AP 150 may function as a central processing unit which manages a whole hardware module system of the airport robot. The AP 150 may transmit, to the microcomputer 110, user input/output information and application program driving information for driving by using position information obtained through various sensors, thereby allowing a motor or the like to be performed.

The user interface unit 160 may include a user interface (UI) processor 161, a long term evolution (LTE) router 162, a WIFI SSID 163, a microphone board 164, a barcode reader 165, a touch monitor 166, and a speaker 167. The user interface processor 161 may control an operation of the user interface unit which performs an input/output of a user. The LTE router 162 may receive necessary information from the outside and may perform LTE communication for transmitting information to the user. The WIFI SSID 163 may analyze WIFI signal strength to perform position recognition on a specific object or the airport robot. The microphone board 164 may receive a plurality of microphone signals, process a sound signal into sound data which is a digital signal, and analyze a direction of the sound signal and a corresponding sound signal. The barcode reader 165 may read barcode information described in a plurality of targets used in airport. The touch monitor 166 may include a monitor for displaying output information and a touch panel which is configured for receiving the input of the user. The speaker 167 may inform the user of specific information through a voice.

The object recognition unit 170 may include a two-dimensional (2D) camera 171, a red, green, blue, and distance (RGBD) camera 172, and a recognition data processing module 173. The 2D camera 171 may be a sensor for recognizing a person or an object on the basis of a 2D image. The RGBD camera 172 may be a camera including RGBD sensors or may be a sensor for detecting a person or an object by using captured images including depth data obtained from other similar three-dimensional (3D) imaging devices. The recognition data processing module 173 may process a signal such as 2D image/video or 3D image/video obtained from the 2D camera and the RGBD camera 172 to recognize a person or an object.

The position recognition unit 180 may include a stereo board (B/D) 181, a light detection and ranging (LIDAR) 182, and a simultaneous localization and mapping (SLAM) camera 183. The SLAM camera 183 may implement simultaneous position tracing and mapping technology. The airport robot may detect ambient environment information by suing the SLAM camera 183 and may process obtained information to generate a map corresponding to a duty performing space and simultaneously estimate its absolute position. The LIDAR 182, a laser radar, may be a sensor which irradiates a laser beam and collects and analyzes rearward-scattered light of light absorbed or scattered by aerosol to perform position recognition. The stereo board 181 may process sensing data collected from the LIDAR 182 and the SLAM camera 183 to manage data for recognizing a position of the airport robot and an obstacle.

The LAN 190 may perform communication with the user interface processor 161 associated with a user input/output, the recognition data processing module 173, the stereo board 181, and the AP 150.

Figure 2:
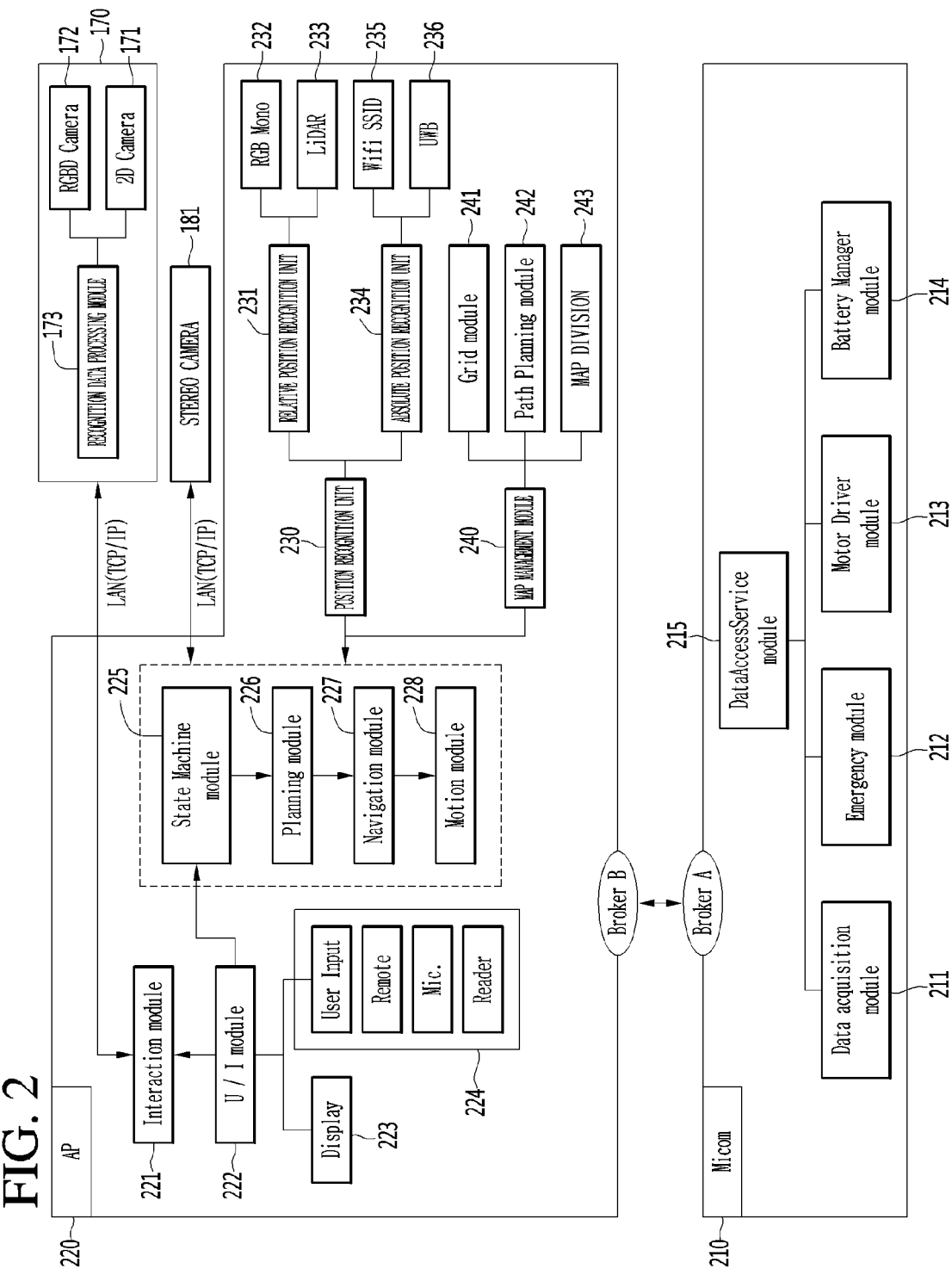
FIG. 2 is a diagram illustrating in detail a configuration of each of a microcomputer and an application processor (AP) of an airport robot according to another embodiment of the present invention.

FIG. 2 is a diagram illustrating in detail a configuration of each of a microcomputer and an AP of an airport robot according to another embodiment of the present invention.

As illustrated in FIG. 2, a microcomputer 210 and an AP 220 may be implemented as various embodiments, for controlling recognition and action of the airport.

For example, the microcomputer 210 may include a data access service module 215. The data access service module 215 may include a data acquisition module 211, an emergency module 212, a motor driver module 213, and a battery manager module 214. The data acquisition module 211 may acquire data sensed from a plurality of sensors included in the airport robot and may transfer the acquired data to the data access service module 215. The emergency module 212 may be a module for sensing an abnormal state of the airport robot, and when the airport robot performs a predetermined type action, the emergency module 212 may sense that the airport robot is in the abnormal state. The motor driver module 213 may manage a wheel, a brush, and driving control of a suction motor for driving and cleaning of the airport robot. The battery manager module 214 may manage charging and discharging of the Li-ion battery 122 of FIG. 3 and may transfer a battery state of the airport robot to the data access service module 215.

The AP 220 may receive, recognize, and process a user input and the like to control an operation of the airport robot with various cameras and sensors. An interaction module 221 may be a module which synthesizes recognition data received from the recognition data processing module 173 and a user input received from a user interface module 222 to manage software exchanged between a user and the airport robot. The user interface module 222 may receive a close-distance command of the user such as a key, a touch screen, a reader, and a display unit 223 which is a monitor for providing manipulation/information and a current situation of the airport robot, or may receive a long-distance signal such as a signal of an IR remote controller for remotely controlling the airport robot, or may manage a user input received of a user input unit 224 receiving an input signal of the user from a microphone, a barcode reader, or the like. When one or more user inputs are received, the user interface module 222 may transfer user input information to a state machine module 225. The state machine module 225 which has received the user input information may manage a whole state of the airport robot and may issue an appropriate command corresponding to a user input. A planning module 226 may determine a start time and an end time/action for a specific operation of the airport robot according to the command transferred from the state machine module 225 and may calculate a path through which the airport will move. A navigation module 227 may be a module which manages overall driving of the airport robot and may allow the airport robot to drive along a driving path calculated by the planning module 226. A motion module 228 may allow the airport robot to perform a basic operation in addition to driving.

Moreover, the airport robot according to another embodiment of the present invention may include a position recognition unit 230. The position recognition unit 230 may include a relative position recognition unit 231 and an absolute position recognition unit 234. The relative position recognition unit 231 may correct a movement amount of the airport robot through an RGM mono sensor 232, calculate a movement amount of the airport robot for a certain time, and recognize an ambient environment of the airport robot through a LIDAR 233. The absolute position recognition unit 234 may include a WIFI SSID 235 and a UWB 236. The WIFI SSID 235 may be an UWB sensor module for recognizing an absolute position of the airport robot and may be a WIFI module for estimating a current position through WIFI SSID sensing. The WIFI SSID 235 may analyze WIFI signal strength to recognize a position of the airport robot. The UWB 236 may calculate a distance between a transmission unit and a reception unit to sense the absolute position of the airport robot.

Moreover, the airport robot according to another embodiment of the present invention may include a map management module 240. The map management module 240 may include a grid module 241, a path planning module 242, and a map division module 243. The grid module 241 may manage a lattice type map generated by the airport robot through an SLAM camera or map data of an ambient environment, previously input to the airport robot, for position recognition. In map division for cooperation between a plurality of airport robots, the path planning module 242 may calculate driving paths of the airport robots. Also, the path planning module 242 may calculate a driving path through which the airport robot will move. Also, the path planning module 242 may calculate a driving path through which the airport robot will move in an environment where one airport robot operates. The map division module 243 may calculate in real time an area which is to be managed by each of a plurality of airport robots.

Pieces of data sensed and calculated from the position recognition unit 230 and the map management module 240 may be again transferred to the state machine module 225.

The state machine module 225 may issue a command to the planning module 226 so as to control an operation of the airport robot, based on the pieces of data sensed and calculated from the position recognition unit 230 and the map management module 240.

Figure 3:
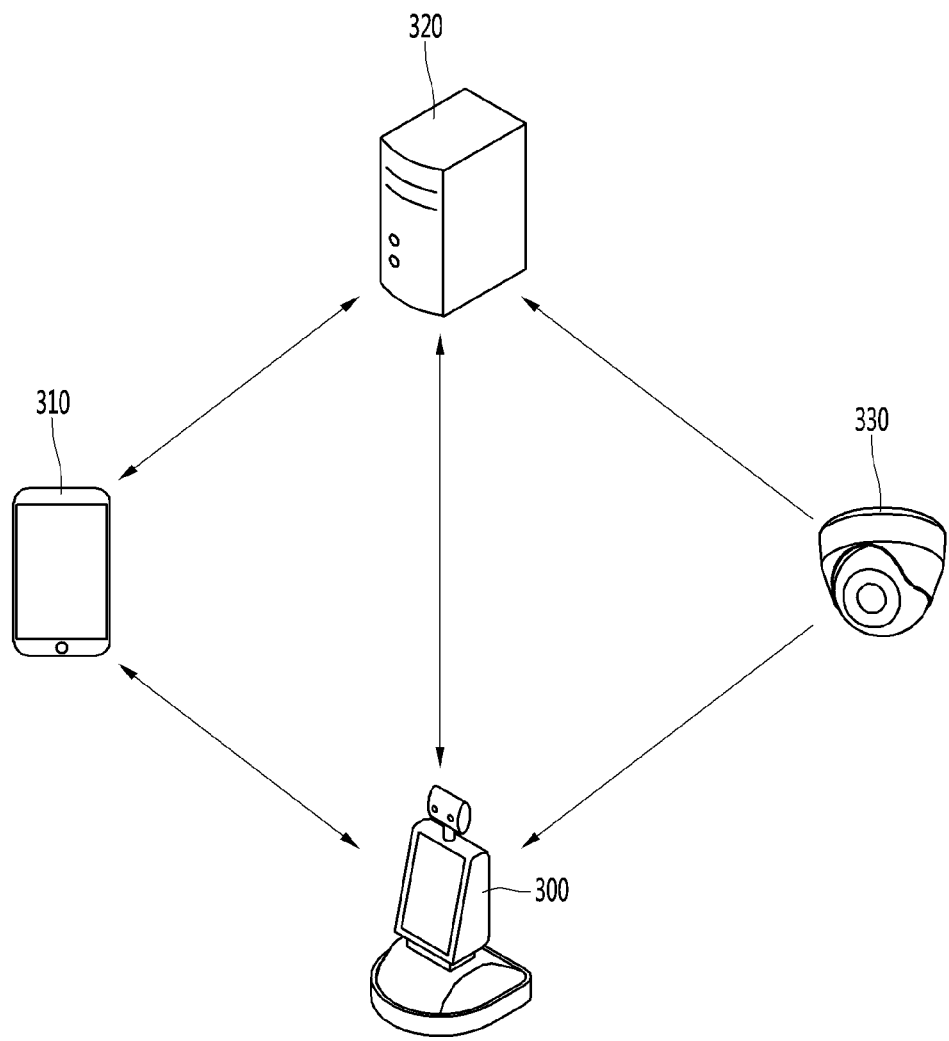
FIG. 3 is a diagram illustrating the structure of an airport robot system according to an embodiment of the present invention.

Next, FIG. 3 is a diagram illustrating the structure of an airport robot system according to an embodiment of the present invention.

The airport robot system according to the embodiment of the present invention may include a mobile terminal 310, a server 320, an airport robot 300 and a camera 330.

The mobile terminal 310 may transmit and receive data to and from the server 320 in the airport. For example, the mobile terminal 310 may receive airport related data such as a flight time schedule, an airport map, etc. from the server 320. A user may receive necessary information of the airport from the server 320 through the mobile terminal 310. In addition, the mobile terminal 310 may transmit data such as a photo, a moving image, a message, etc. to the server 320. For example, the user may transmit the photograph of a missing child to the server 320 to report the missing child or photograph an area of the airport where cleaning is required through a camera to request cleaning of the area.

In addition, the mobile terminal 310 may transmit and receive data to and from the airport robot 300.

For example, the mobile terminal 310 may transmit, to the airport robot 300, a signal for calling the airport robot 300, a signal for instructing that specific operation is performed, or an information request signal. The airport robot 300 may move to the position of the mobile terminal 310 or perform operation corresponding to the instruction signal in response to the call signal received from the mobile terminal 310. Alternatively, the airport robot 300 may transmit data corresponding to the information request signal to the mobile terminal 310 of the user.

Next, the airport robot 300 may perform patrol, guidance, cleaning, disinfection and transportation within the airport.

The airport robot 300 may transmit and receive signals to and from the mobile terminal 310 or the server 320. For example, the airport robot 300 may transmit and receive signals including information on the situation of the airport to and from the server 320. In addition, the airport robot 300 may receive image information of the areas of the airport from the camera 330 in the airport. Accordingly, the airport robot 300 may monitor the situation of the airport through the image information captured by the airport robot 300 and the image information received from the camera 330.

The airport robot 300 may directly receive a command from the user. For example, a command may be directly received from the user through input of touching the display unit provided in the airport robot 300 or voice input. The airport robot 300 may perform patrol, guidance, cleaning, etc. according to the command received from the user, the mobile terminal 310 or the server 320.

Next, the server 320 may receive information from the mobile terminal 310, the airport robot 300 and the camera 330. The server 320 may collect, store and manage the information received from the devices. The server 320 may transmit the stored information to the mobile terminal 310 or the airport robot 300. In addition, the server 320 may transmit command signals to a plurality of the airport robots 300 disposed in the airport.

The camera 330 may include a camera installed in the airport. For example, the camera 330 may include a plurality of closed circuit television (CCTV) cameras installed in the airport, an infrared thermal-sensing camera, etc. The camera 330 may transmit the captured image to the server 320 or the airport robot 300.

Figure 4:
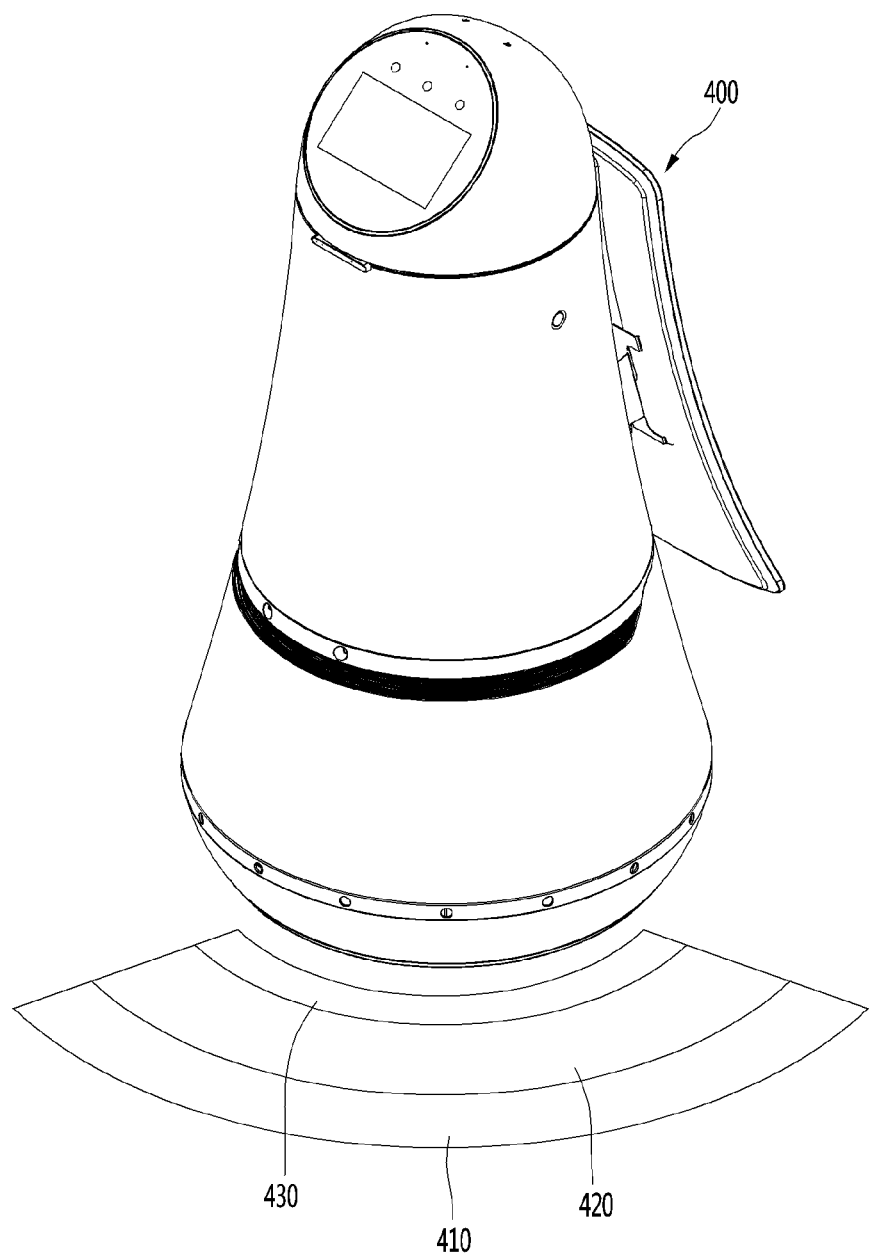
FIG. 4 is a diagram illustrating an example in which the airport robot according to the embodiment of the present invention detects a human body or an object at each predetermined distance.

FIG. 4 is a diagram illustrating an example in which the airport robot according to the embodiment of the present invention detects a human body or an object at each predetermined distance.

As illustrated in FIG. 4, the airport robot 400 according to the embodiment of the present invention may activate different types of object recognition modes for each distance or predetermined range. For example, when the human body or the object is detected in a first range 410, the user interface unit 160 of the airport robot 400 may automatically wake up. When the user approaches the first range 410 among the sensing ranges of the airport robot 400, the user may interface with the airport robot without manually waking up the airport robot 400. In addition, when the human body or the object is detected in a second range 420, the airport robot 400 can execute a mode for interfacing with the user. When the user is in the second range 420, the airport robot 400 may deliver a message indicating that the interface is available before the user makes a request via a speaker or a text. In addition, when the airport robot 400 detects that the user is within a third range 430, the airport robot 400 may activate a risk mode. At this time, the airport robot 400 may output a warning sound to a speaker, or may output a warning message or the like to a monitor, thereby notifying the user that the airport robot 400 is too close to the user. When the user moves away from the third range 430 to the second range 420, the airport robot 400 may stop the risk mode and notify the user that the user is in a safe distance. Alternatively, when the airport robot 400 detects that the user is within the third range 430, the airport robot 400 may move in a direction away from itself by keeping a certain distance from the user or allowing the user to enter the second range 420.

Furthermore, the airport robot 400 may provide the user with a guidance service while traveling to a specific destination. In this case, the airport robot 400 may move while continuing to sense the distance from the user so that the user is located within at least the first range 410. Therefore, the airport robot 400 may provide the guidance service while always keeping the distance from the user within a certain range.

Figure 5:
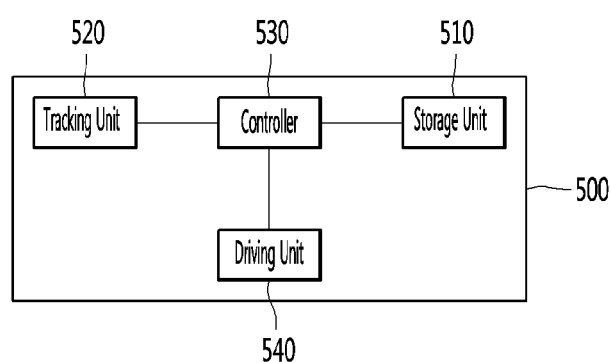
FIG. 5 is a schematic block diagram of the structure of the airport robot having a tracking function according to the present invention.
Figure 6:
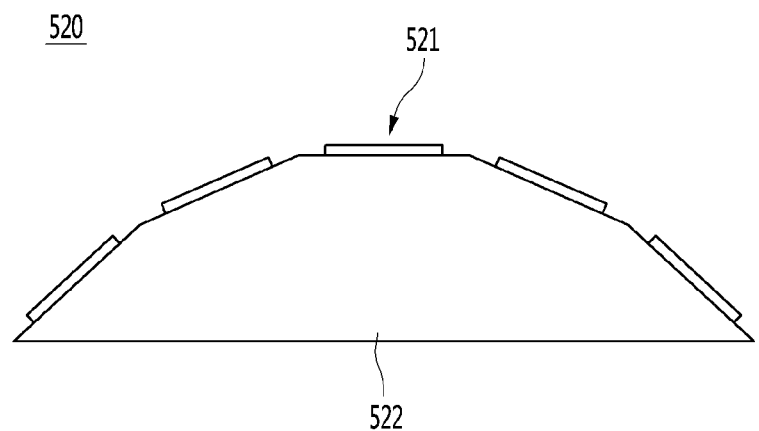
FIG. 6 is a schematic diagram for explaining a distance measurement sensor module of an estimation unit applied to FIG. 5.
Figure 7:
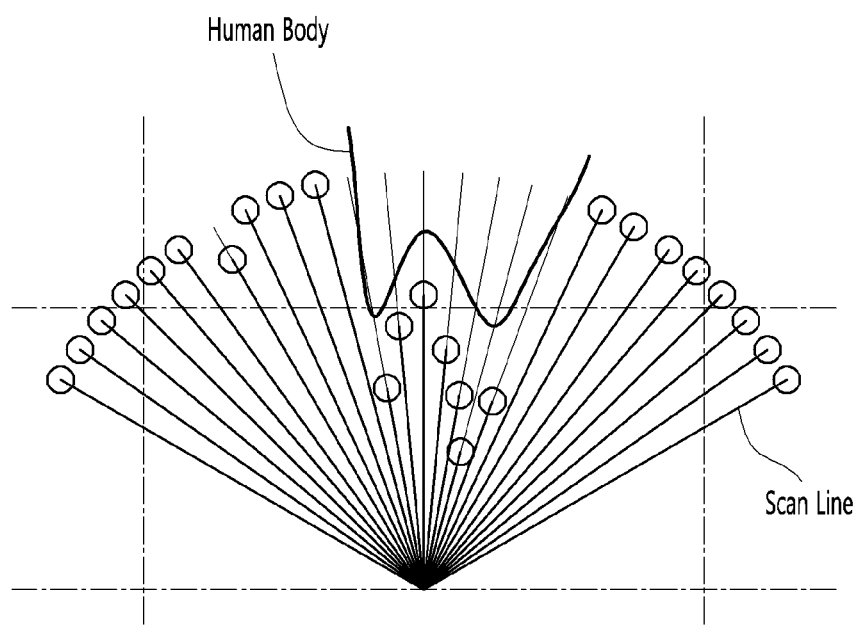
FIG. 7 is a diagram for explaining a method for recognizing a person according to the present invention.

FIG. 5 is a schematic block diagram of the structure of the airport robot having a tracking function according to the present invention, FIG. 6 is a schematic diagram for explaining a distance measurement sensor module of an estimation unit applied to FIG. 5, FIG. 7 is a diagram for explaining a method for recognizing a person according to the present invention, and FIG. 8 is a flowchart illustrating a person tracking method of a robot according to the present invention.

As illustrated in FIG. 5, the airport robot 500 having the tracking function according to the present invention includes a storage unit 510 configured to store registered user recognition information and a tracking progress program, a tracking unit 520 attached to one side of the front side of the robot and configured to recognize and output a position of a person, a controller 530 configured to read the user recognition information stored in the storage unit 510 in response to a person position recognition signal input from the tracking unit 510, compare the person position recognition signal of the tracking unit 510 with the read user recognition information to determine whether the person is a registered user, and control the entire system to perform tracking progress when the person is the registered user, and a driving unit 540 configured to the robot 500 in response to the control according to the tracking progress of the controller 530.

As illustrated in FIG. 6, the tracking unit 520 includes a plurality of distance measurement sensor modules 521 attached to a main body 522 in a state of having a predetermined angle and a predetermined spacing distance such that a plurality of scan lines emitted from the respective distance measurement sensor modules 521 are not overlapped.

The distance measurement sensor module 521 uses a plurality of position sensitive detector (PSD) sensors for recognizing the position of the person and the obstacle, and each sensor may have one or more infrared (IR) LEDs. The plurality of LEDs are arranged at a constant angle.

That is, the distance measurement sensor module 521 may be disposed at a desired angle so as to detect the person and the obstacle. The scan lines of each sensor sense only the allocated region without overlapping.

The controller 530 recognizes the distance through the scan lines emitted from the distance measurement sensor 521 of the tracking unit 520 and recognizes the person by using the recognized distance information. At this time, the shape of the person recognized by the controller 530 can be changed to a leg, a body, a head, or the like according to the scan height of the tracking unit 520.

When the shape of the person is recognized, the controller 530 tracks the position of the person by using recognized person shape recognition data and stochastically approaches the position of the person by using an ROI scheme.

When the controller 530 recognizes the shape of the person and completes the tracking as described above to grasp the position of the person, the controller 530 controls the driving unit 540 to drive the robot 500 to track the person.

The operation of the robot having the tracking function according to the embodiment of the present invention will now be described.

When the user sets the tracking function through a user interface (not illustrated) provided in the robot, the controller 530 switches the current mode of the robot to the tracking mode according to the tracking function set through the user interface (not illustrated) (S810).

The controller 530 that has switched the current mode of the robot to the tracking mode periodically controls the distance measurement sensor module 521 of the tracking unit 520 such that the distance measurement sensor module 521 emits an IR signal at predetermined time intervals to form predetermined scan lines (S820).

The controller 530 recognizes the distance through the scan lines emitted from the distance measurement sensor 521 of the tracking unit 520 and recognizes the person by using the recognized distance information (S830). At this time, the shape of the person recognized by the controller 530 can be changed to a leg, a body, a head, or the like according to the scan height of the tracking unit 520.

When the shape of the person is recognized in operation S830, the controller 530 tracks the position of the person by using recognized person shape recognition data (S840) and stochastically approaches the position of the person by using an ROI scheme.

When the controller 530 recognizes the shape of the person in operation S840 and completes the tracking to grasp the position of the person, the controller 530 controls the driving unit 540 to drive the robot 500 to track the person (S850).

The airport robot that images the human body in a certain distance in real time to continuously track the same airport user will be described with reference to FIGS. 9 to 17.

As illustrated in FIG. 9, the human tracking imaging system of the present invention includes a camera 910 configured to transmit infrared pulses and measures the time difference received by reflection to acquire a depth image.

The camera 910 is a time of flight (TOF) camera. The camera 910 includes an infrared sensor and measures a pattern by infrared transmission and reception to acquire a depth image for each distance, thereby detecting the human body.

Figure 10:
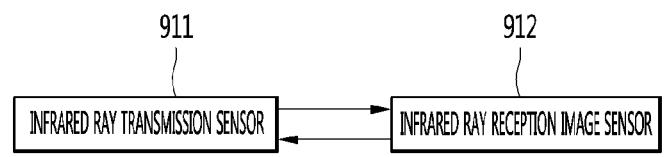
FIG. 10 is a block diagram of a TOF camera of the human body tracking imaging system of the present invention.

FIG. 10 illustrates the structure of the camera 910.

As illustrated in FIG. 10, the camera 910 of the present invention includes an infrared ray transmission sensor 911 configured to transmit infrared rays to an object located ahead (including the human body and including all objects capable of reflecting infrared rays), and an infrared ray reception image sensor 912 configured to receive a signal reflected from the object and converting the received signal into image data.

The image sensor 912 is, for example, a CCD image sensor or a CMOS image sensor. The principle of image acquisition by distance by the image sensor 912 will be described with reference to FIGS. 11 and 12.

When the object is illuminated by the camera 910, the infrared ray transmitted from the infrared ray transmission sensor 911 is reflected by the object, the reflected wave is received by the infrared ray reception image sensor 912, and the shape of the object is acquired as the image data. Since the image data is acquired in time order, it is possible to acquire an image covering from the earliest acquired image to the latest acquired image.

When the image data acquired in this way are listed in order of time, the distance to the object can be inferred because it is proportional to the distance.

At this time, the distance to the object can be calculated through the trigonometric function based on the distance between the infrared ray transmission sensor 911 and the infrared ray reception image sensor 912 for more precise distance calculation.

Figure 11:
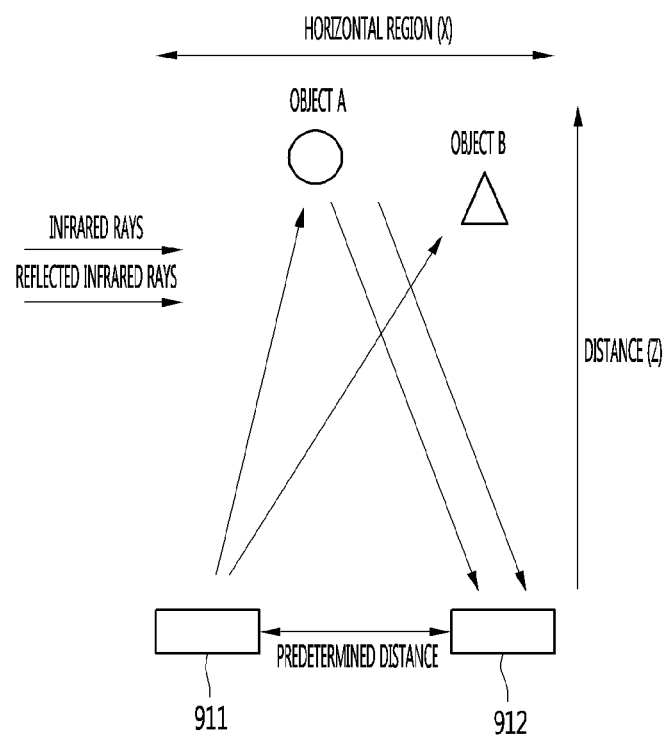
FIGS. 11 and 12 are operational principle diagrams of a TOF camera constructed in the human body tracking imaging system of the present invention.
Figures 12, 13:
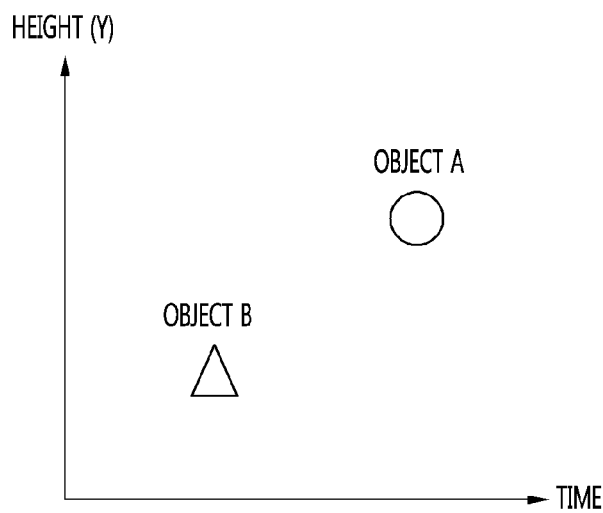
FIG. 13 is a diagram illustrating an example of characteristic image data related to the human body according to an embodiment of the present invention.

As illustrated in FIGS. 11 and 12, the object B will acquire an image faster than the object A in time by the infrared ray reception image sensor 912. At this time, since the distance between the two sensors 911 and 912 is formed, it is possible to calculate the distance to the acquired image by using the trigonometric function.

Since the distance is estimated based on the image data obtained by the time difference, it is called a depth image. In the distance-specific image in which the background and the foreground acquired by the camera 910 are integrated, only the human body image data except for the foreground and background images by software is separated as described above.

Therefore, the human body, more broadly, the characteristic image data related to the human body is set in advance and managed. For example, as illustrated in FIG. 13, these data are provided as image data of more than 50 different feature points, such as a circular shape of a head, a circular shape of a body larger than the head, and two arms, and two legs.

The human body imaging camera 920 images the human body while moving according to new coordinates obtained by matching the human body image coordinates extracted from the distance-specific image obtained by the camera 910 with the actual coordinates. Such coordinates can be obtained by the controller 930, and the movement of the camera 910 is also controlled by the controller 930.

The controller 930 adjusts the PTZ of the camera 920 so as to photograph the human body as the camera 920 moves along the newly obtained coordinates by matching the extracted human body image coordinates and the actual space coordinates.

Figure 14:
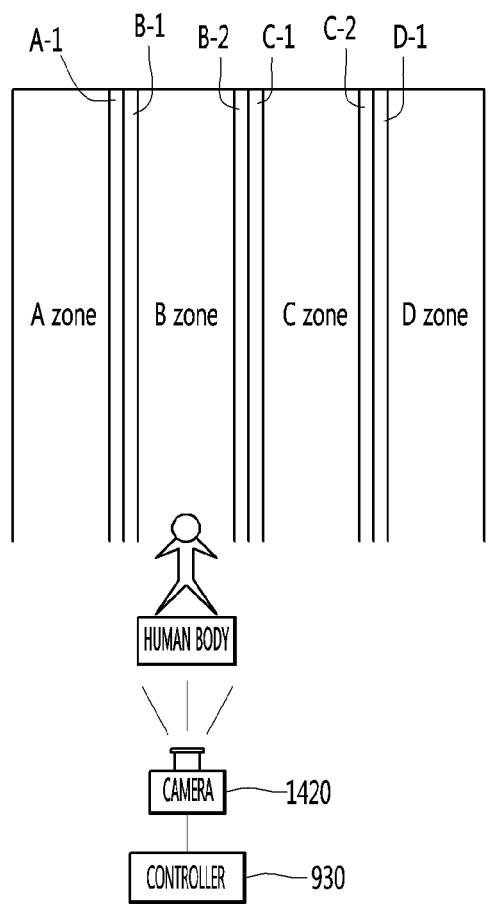
FIG. 14 is a conceptual diagram illustrating the operation of the human body tracking imaging system according to an embodiment of the present invention.
Figure 15:
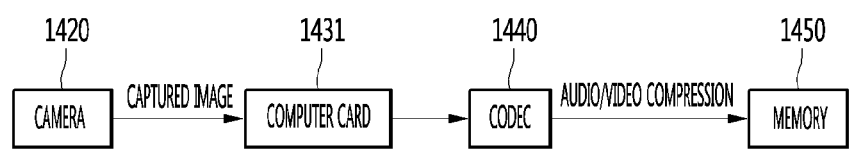
FIG. 15 is a control block diagram for use of video and audio data acquired by the human body tracking imaging system according to the embodiment of the present invention.

As illustrated in FIG. 14, for the human body tracking of the present invention, the space in which the human body moves is divided into four zones A, B, C, and D, and a predetermined distance between these spaces is sub-divided into A-1, B-1, B-2, C-1, C-2, and D-1, such that the camera 1420 can track the moving human body between the respective spaces.

The movement of the camera 1420 is performed not for continuously tracking the movement of the human body but for each section to thereby reduce the number of movements of the camera 1420 to the minimum.

That is, the division of the space is not to track and photograph the movement of the human body unconditionally, but to divide the space into a large space and then sub-divided the large space. When the human body moves across the large space, the human body necessarily passes through the sub-divided space or stays in the subdivided space. Therefore, in order to prevent unnecessary movement of the camera 1420 and enable efficient human body tracking by sensing the situation in detail.

The human body tracking using the coordinates according to the present invention will be described with reference to FIG. 16.

When the infrared rays are transmitted from the infrared ray transmission sensor 911 of the camera 910 to the foreground of the airport, for example, the gate (S1610), the transmitted infrared rays are reflected by all possible reflective objects located on the front side of the camera 910 such as a reflective object, for example, a gate sign board and a human body, and are received by the infrared ray reception image sensor 912 (S1620). The infrared rays received by the image sensor 912 are converted into image data.

At this time, since all the reflective objects located on the front face of the camera such as the gate sign board and the human body are different from each other (since the distances from the cameras transmitting the infrared rays are different), the controller 1430 counts the time when the infrared rays are reflected and converted into the image data, and extracts only human body image data (S1640) obtained by separating the foreground and background images from the distance-specific image (S1630).

The farthest depth image is the background, and the changed image compared with the next frame is regarded as motion data and compared with the human feature point. That is, the image data thus extracted and obtained is compared with the data indicating the characteristics of the human body illustrated in FIG. 13 (S1650).

When the human body image is extracted (S1660), the controller 1430 calculates new coordinates by matching the x-axis of the actual space with the x-axis of the human body image (S1670), and the PTZ (pan tilt) of the camera 1420 is adjusted with the obtained x-axis coordinate such that the human body is tracked and photographed (S1680).

The camera operation for tracking and photographing the human body according to the present invention will be described with reference to FIG. 17.

The present invention does not simply move the camera 1420 continuously while tracing the moving line of the human body, but divides the moving space of the human body into several zones in advance.

For example, as illustrated in FIG. 14, in a state in which the space is largely divided and set to four zones A, B, C, and D (S1710), when the human body is in zone A (S1720), that is, when the extracted human image data coordinates are in the A zone based on the result of separating the image data from the depth image of the camera 910 and comparing the image data with the human body characteristic data (S1730), the camera 920 is moved to the zone A and performs photographing (S1740).

In this state, for example, when the human body moves from the zone A to the zone B, it is necessary to pass the boundary between the zone A and the zone B. Therefore, the camera 920 moves in the order of the zone A, the zone A-1, the zone B-1, and the zone B (S1760). In other words, conventionally, the camera keeps moving while continuously tracking the movement of the human body, but the present invention separates the space and moves the camera 920 whenever the human body is positioned in the space.

Therefore, only when the human body moves in the above order, the camera 920 is moved from the zone A to the zone B (S1750). Otherwise, the movement at the position of the current zone is prevented (S1751).

When the human body is located in the boundary zone between any zones as described above and there is slight movement and the camera 920 continuously tracks and photographs the human body while moving the zone A and the zone B, the movement change of the photographed image is so severe that the quality of the moving image may be degraded. Therefore, the camera 920 is controlled to move in each section to acquire the natural motion image of the human body.

The present invention may be embodied as computer-readable codes on a program-recorded medium. The computer-readable recording medium may be any recording medium that can store data which can be thereafter read by a computer system. Examples of the computer-readable medium may include a hard disk drive (HDD), a solid state disk (SSD), a silicon disk drive (SDD), a ROM, a RAM, a CD-ROM, a magnetic tape, a floppy disk, and an optical data storage device, and may also be implemented in the form of a carrier wave (for example, transmission over the Internet). The computer may also include the AP 150 of the airport robot. Therefore, the above description is illustrative and should not be construed as limited in all aspects. The scope of the present invention should be determined by rational interpretation of the appended claims, and all changes within the scope of equivalents of the present invention are included in the scope of the present invention.

The invention claimed is:

1. A robot comprising:
   a user interface configured to receive an input from a user;
   an object recognition sensor configured to sense a human body and an object;
   a position recognition sensor configured to sense positions of the human body and the object;
   and
   a controller configured to control an operation of the robot,
   wherein a first range and a second range are set according to distance separated away from the robot, and the second range is set closer to the robot than the first range,
   wherein the controller is configured to perform control such that:
   when the human body is detected within the first range, the robot is woken up and a touch monitor included in the user interface is turned on, and when the human body which has passed the first range is detected within the second range, content for receiving an input from the user is output on the touch monitor, wherein a third range is set closer to the robot than the second range, and wherein the controller is further configured to perform control such that, when the human body that has passed the second range and the first range is detected within the third range, a warning sound is output and the robot is moved away from the human body by a predetermined distance.

2. The robot according to claim 1, further comprising:

a storage configured to store user recognition information and a tracking progress program; and a tracking sensor attached to one side of a front side of the robot and configured to recognize and output position information of a person, wherein the controller is further configured to perform control to read the user recognition information stored in the storage in response to a person position recognition signal input from the tracking sensor, to compare the person position recognition signal of the tracking sensor with the read user recognition information to determine whether the person is a registered user to be tracked, and to perform tracking progress when the person is the registered user.

3. The robot according to claim 2, wherein the tracking sensor comprises a plurality of distance measurement sensor modules attached to a main body in a state of having a predetermined angle and a predetermined spacing distance such that a plurality of scan lines emitted from respective sensors are not overlapped.

4. The robot according to claim 2, wherein the controller is further configured to recognize a distance through scan lines emitted from a distance measurement sensor of the tracking sensor and recognize the user by using the recognized distance information.

5. The robot according to claim 4, wherein a shape of the person recognized by the controller is one of a leg, a body or a head according to a scan height of the tracking sensor.

6. The robot according to claim 4, wherein when the shape of the person is recognized, the controller is further configured to perform control to track a position of the person by using recognized person shape recognition data and to stochastically approach the position of the person.

7. The robot according to claim 2, wherein the tracking sensor comprises an infrared ray transmission sensor configured to transmit infrared rays forward, and an infrared ray reception image sensor configured to receive infrared rays transmitted from the infrared ray transmission sensor and reflected from an object and convert the received infrared rays into image data.

8. The robot according to claim 7, wherein a distance-specific image obtained by the tracking sensor is an integrated image of a foreground, a background, and a human body image.

9. The robot according to claim 7, wherein a distance-specific image obtained by the tracking sensor is separated into a foreground, a background, and a human body image by a time difference.

10. The robot according to claim 9, wherein the controller is further configured to:

divide a space into a plurality of zones;

move the tracking sensor toward a first zone in which the separated human body image is located among the plurality of zones;

when the human body corresponding to the human body image moves within the first zone, not move the tracking sensor; and when the human body moves from the first zone to a second zone, move the tracking sensor from the first zone toward the second zone.

11. The robot according to claim 10, wherein a third zone is located at a boundary of the first zone, a fourth zone is located at a boundary of the second zone, and the third zone and the fourth zone are adjacent to each other, wherein when the human body moves from the first zone to the second zone, the controller is further configured to move the tracking sensor to sequentially face the first zone, the third zone, the fourth zone, and the second zone.

* * * * *